Patented Mar. 13, 1951

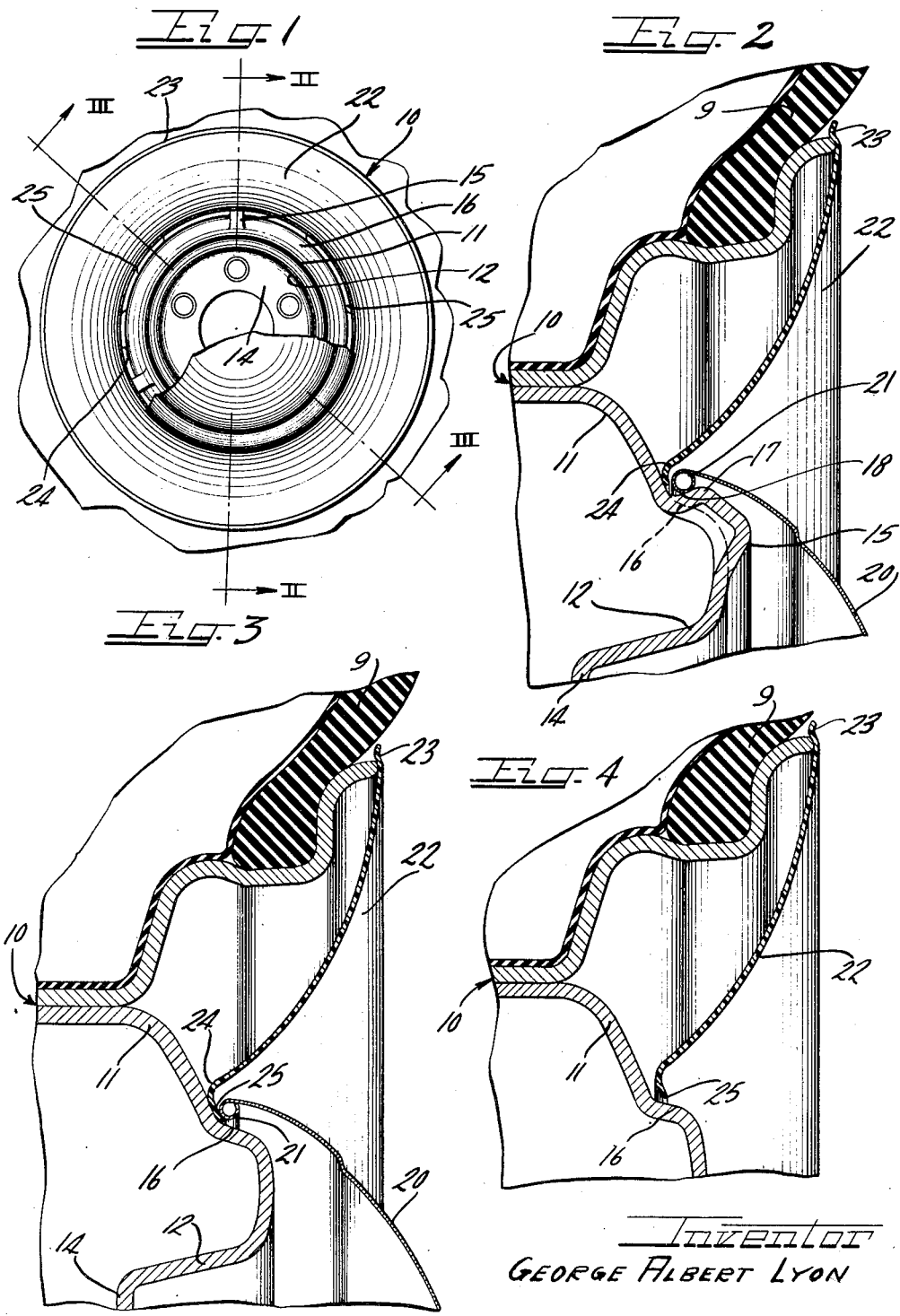

2,544,700

UNITED STATES PATENT OFFICE 2,544,700

WHEEL COVER

George Albert Lyon, Allenhurst, N. J.

Application March 14, 1946, Serial No. 654,287

1 Claim. (Cl. 301—37)

This invention relates to a wheel cover and more particularly to a wheel and cover assembly wherein the cover is retained in a unique manner on the wheel.

An object of this invention is to provide a wheel cover which can be easily retained on an automobile wheel by the use of parts on the wheel, such as those employed in connection with a hub cap, and without necessitating the use of any additional retaining means.

Another object of this invention is to provide a new way of clamping an annular wheel cover to a wheel by a hub cap.

In accordance with the general features of this invention, there is provided in a cover structure for a wheel including a multi-flanged tire rim and a load bearing part having a radially outwardly facing annular shoulder with spaced radial hub cap retaining bumps, a wheel cover comprising an annular ring disposed opposite side flanges of the tire rim and having a radially inner margin notched out at spaced intervals to clear said bumps and having portions between said notches and bumps for engaging said annular shoulder on the body part.

Another feature of the invention relates to the tensioning of the radially inner portions of the wheel cover when it is clamped against the body part.

Still another feature of the invention relates to clamping the inner marginal portions of the cover to the body part by the hub cap and at the same time forcing the outer margin of the cover into tight contact with an outer edge of the tire rim.

Other objects and features of this invention will more fully appear from the following detailed description taken in connection with the accompanying drawings, which illustrate a single embodiment thereof, and in which Figure 1 is a fragmentary side view of a wheel cover assembly embodying the features of this invention, showing the cover applied to a wheel and showing the hub cap partly broken away in order to show the structure of the cover therebehind;

Figure 2 is an enlarged fragmentary cross sectional view taken on substantially the line II—II of Figure 1 looking in the direction indicated by the arrows;

Figure 3 is an enlarged fragmentary sectional view similar to Figure 2, but taken on the line III—III of Figure 1 looking in the direction indicated by the arrows; and Figure 4 is an enlarged fragmentary sectional view similar to Figure 3, but with the hub cap omitted.

As shown on the drawings:

As best shown in Figure 2, the wheel has mounted on it the usual tire and tube assembly 9, which is seated in the flanges of a multi-flanged drop center type of tire rim 10. This conventional tire rim 10 is carried by a load bearing or body part 11, which comprises a dished metallic stamping. The body part 11 includes a centrally depressed portion 12, terminating in a radial bolt-on flange 14 (Figure 1) which is adapted to be fastened by bolts or cap screws (not shown) to a part on an axle, as is well known in the art.

The body part 11 is bulged axially outwardly and is provided with a plurality of spaced protuberances or bumps 15, which emanate from an annular shoulder 16. This shoulder 16 faces radially outwardly with respect to the center of the wheel.

Each of the bumps 15 includes a high point 17 and a reentrant or inclined portion 18. The bumps may be of any suitable number, such, for example, as three to five, although in Figure 1 I have illustrated a wheel as being provided with three of them. The bumps are so arranged that the high points 17 are in a common circle and such as to require a camming of a cover edge over them in order for the edge of the cover to be seated on the bottom of the inclined portion 18 of each of the bumps.

A sheet metal hub cap 20 having an underturned rolled edge 21 is cooperable with the bumps 15. More specifically the continuous springy edge 21 of the hub cap is adapted to be sprung over the high points 17 of the bumps into retained engagement with the inclined portions 18 of the bumps.

In view of the fact that the inclined portions 18 of the bumps are disposed radially beyond the annular shoulder 16, the edge 21 in being deflected outwardly at spaced points results in portions of the edge between the bumps being deflected inwardly into clamping engagement with the shoulder 16 between the bumps. In other words, this results in the edge 21 assuming a serpentine-like shape. The advantage of this arrangement is that the hub cap is enabled to have a much more effective and tighter clamping engagement with the body part. This structure, however, by itself and apart from the outer annular cover to be hereinafter described is not a part of this invention, as it is being covered in my copending patent application, Serial No. 618,825, filed September 27, 1945, now Patent No. 2,445,330, issued July 20, 1948. In fact, the present application is a continuation-in-part of that earlier filed application.

Cooperable with the hub cap 20 is an annular cover ring 22 which may be made of any suitable material, such as stainless steel, or the like, although I preferably contemplate making it of plastic, such as, ethyl cellulose, cellulose acetate or vinyl resins. Such plastics are resiliently pliable and may be deflected temporarily without permanent deformation.

The ring 22 has an outer turned edge 23 adapted to overhang an outer edge of the tire rim 10. This ring 22 from the edge 23 extends axially and radially inwardly to the body part opposite the annular shoulder 16. It will be perceived that the ring is convexly curved and is of such configuration and radial depth that in use it gives the illusion of being a continuation of the side wall of the tire. This illusion can be accentuated if the ring has a white external finish in which event it appears to constitute a white side wall part of the tire giving the overall appearance of a massive tire having a white side wall extending clear down to the hub cap of the wheel.

The radially inner margin of the cover 22 is slightly turned at 24 and is notched out to provide projections or tabs 25 adapted to contact the body part beyond the inclined portion 18 of the bumps as shown in Figure 3. The notches are of such depth that the cover can ride clear over the bumps, as shown in Figure 1, with the tabs spaced from each other and disposed between the bumps. In this manner, it is not necessary to snap the inner edge of the cover over the bumps.

Normally when the cover is placed on the wheel, as shown in Figure 4, its outer turned edge 23 is in engagement with the outer edge of the rim part 10. The inner curved edge and more particularly the tabs 25 thereof, however, are not in contact with the body part but are slightly spaced therefrom, as shown in Figure 4. If the cover is made of metal, this is of particular significance since it enables the cover to readily accommodate slight manufacturing tolerances in the wheel, such, for example, as different axial displacements of the rim with respect to the body part. The rim in actual practice may be displaced as much as one-eighth of an inch in an axial direction with reference to the bulged portion of the body part.

Now when the hub cap 20 is sprung over the bumps 15, its turned edge 21 engages the tabs or fingers 25 of the cover and springs them axially rearwardly into tensioned engagement with the body part, at the axially inner end of the shoulder 16.

The hub cap can be easily removed by inserting the end of a screw-driver under its turned edge 25 and by forcibly prying it off of the bumps 15.

I claim as my invention:

In a wheel structure including a wheel comprising a tire rim and a central body part having an outer side face, a circular wheel cover for the outer side face of the body part and provided with a continuous springy turned edge, said body part having on its outer side a generally axially extending and radially outwardly facing shoulder of a diameter substantially less than that of said springy edge, portions of the shoulder projecting radially outwardly throughout the width of the shoulder and providing cover retaining bumps, said springy edge being engaged with said bumps in close proximity to the junctions of said bumps with the body part with the portions of the springy edge intermediate the bumps sprung radially and axially inwardly into tight engagement with the wheel side face as the portions of the edge engaging said bumps are stretched radially outwardly whereby said edge engages the bumps in spaced relation to the body and bears against the body at the portions between the bumps, and a circular trim ring positioned on the wheel radially outwardly of the bumps and having an inner margin notched out on a diameter greater than the diameter described by the bumps in order to entirely clear the bumps and having tabs narrower than the notches projecting generally radially inwardly toward said shoulder intermediate the bumps and said tabs being clamped against the wheel body by the portions of the springy edge intermediate the bumps.

GEORGE ALBERT LYON.

REFERENCES CITED

The following references are of record in the file of this patent:

UNITED STATES PATENTS

| Number | Name | Date |
|---|---|---|
| Re. 21,179 | Lyon | Aug. 22, 1939 |
| 2,263,243 | Lyon | Nov. 18, 1941 |
| 2,368,254 | Lyon | Jan. 30, 1945 |